US010270367B2

(12) United States Patent
Sodo et al.

(10) Patent No.: US 10,270,367 B2
(45) Date of Patent: Apr. 23, 2019

(54) FREQUENCY CONVERTER WITH LCL LINE AND COMMON MODE FILTER

(71) Applicant: Vacon Oy, Vaasa (FI)

(72) Inventors: Nicklas Sodo, Vaasa (FI); Jaakko Ollila, Pirkkala (FI); Laakso Martti, Tampere (FI)

(73) Assignee: VACON OY, Vaasa (FI)

( * ) Notice: Subject to any disclaimer, the term of this patent is extended or adjusted under 35 U.S.C. 154(b) by 0 days.

(21) Appl. No.: 16/069,549

(22) PCT Filed: Jan. 21, 2016

(86) PCT No.: PCT/EP2016/051207
§ 371 (c)(1),
(2) Date: Jul. 12, 2018

(87) PCT Pub. No.: WO2017/125154
PCT Pub. Date: Jul. 27, 2017

(65) Prior Publication Data
US 2019/0028039 A1     Jan. 24, 2019

(51) Int. Cl.
*H02M 7/5395*     (2006.01)
*H02M 1/12*     (2006.01)
(Continued)

(52) U.S. Cl.
CPC ......... *H02M 7/5395* (2013.01); *H02M 1/126* (2013.01); *H02M 1/14* (2013.01); *H02M 5/4585* (2013.01); *H02M 2001/123* (2013.01)

(58) Field of Classification Search
CPC .. H02M 7/521; H02M 7/5387; H02M 7/5395; H02M 7/53875; H02M 3/33507;
(Continued)

(56) References Cited

U.S. PATENT DOCUMENTS 5,357,418 A * 10/1994 Clavel ............... H02M 3/33576
                                                       323/266
8,207,712 B2 * 6/2012 Hasler .................. H02J 3/1842
                                                       323/208
(Continued)

FOREIGN PATENT DOCUMENTS

DE    102007021368 A1    11/2008
DE    102012025593 A1    9/2013
(Continued)

OTHER PUBLICATIONS

International Search report for PCT Serial No. PCT/EP2016/051207 dated Oct. 13, 2016.
(Continued)

*Primary Examiner* — Adolf D Berhane
(74) *Attorney, Agent, or Firm* — McCormick, Paulding & Huber LLP

(57) ABSTRACT

A filtering method and arrangement for a system comprising a regenerative frequency converter and a motor, which regenerative frequency converter has an intermediate DC circuit comprising positive and negative pole and which regenerative frequency converter is connected to a supplying 3-phase mains network via a line filter unit comprising in serial connection a first 3-phase inductor unit with mains side terminals and motor side terminals and a second 3-phase inductor unit, and a 3-phase capacitor unit which comprises phase-specific capacitors which are connected in star connection between the motor side terminals of the first 3-phase inductor unit and a star point, which star point is connected to ground via a fourth capacitor. The filtering arrangement further comprises a common mode inductor unit and a filtering capacitor unit. Filtering capacitor unit comprises two capacitors in serial connection between the poles of the intermediate DC circuit such that the common point of the capacitors is connected to the star point of the
(Continued)

capacitor unit in the line filter unit. The filter arrangement is configured to determine the control pattern of the controllable power switches by using a 60° bus clamp modulation or a softened 60° bus clamp modulation.

20 Claims, 3 Drawing Sheets

(51) Int. Cl.
  *H02M 5/458* (2006.01)
  *H02M 1/14* (2006.01)

(58) Field of Classification Search
  CPC .......... H02M 1/12; H02M 1/126; H02M 1/14; H02M 5/27; H02M 5/271; H02M 2001/123; H02M 5/4585
  See application file for complete search history.

(56) References Cited

U.S. PATENT DOCUMENTS

2009/0140829 A1* 6/2009 Sodo .............. H01F 37/00
  336/5
2010/0308559 A1* 12/2010 Tarasinski .......... A01B 59/00
  280/422
2012/0105072 A1* 5/2012 Peterson ............. G01R 31/42
  324/511
2016/0308368 A1* 10/2016 Letas ................. H02J 3/12
2018/0108472 A1* 4/2018 Pagenkopf ........... H01F 17/062

FOREIGN PATENT DOCUMENTS

| | | |
|---|---|---|
| EP | 1148629 A2 | 10/2001 |
| EP | 2408093 A2 | 1/2012 |
| EP | 2814164 A2 | 12/2014 |
| JP | 2005033895 A | 2/2005 |
| JP | 2007325377 A | 12/2007 |
| JP | 2009148078 A | 7/2009 |
| JP | 2010028942 A | 2/2010 |
| JP | 2010288381 A | 12/2010 |
| JP | 2015156732 A | 8/2015 |
| WO | 2012025660 A1 | 3/2012 |

OTHER PUBLICATIONS

Varjasi et al., "Sensorless Control of a Grid-Connected PV Converter," 12th International Power Electronics and Motion Control Conference, IEEE, PI, p. 901-906 (2006).

* cited by examiner

FREQUENCY CONVERTER WITH LCL LINE AND COMMON MODE FILTER

CROSS-REFERENCE TO RELATED APPLICATION

This application is a National Stage application of International Patent Application No. PCT/EP2016/051207, filed on Jan. 21, 2016, which is hereby incorporated by reference in its entirety.

TECHNICAL FIELD

The present invention relates to a reduction of the common mode interference caused by a regenerative AC/AC converter.

BACKGROUND

A normal method to adjust AC motor shaft rotation speed is to adjust its supplying voltage magnitude and frequency by a frequency converter (FC). Prevailing FC technology is called PWM (pulse width modulation), wherein the device is comprised of a rectifier for mains voltage rectification, a filtered DC voltage intermediate power bus and an inverter bridge for generating the output voltage. The output voltage consists of pulses formed by fast power electronic switches, normally IGBTs (insulated gate bipolar transistors). A similar inverter unit as used in motor side may also be used in mains side e.g. in cases where the motor may work in generator mode or the load machine is a generator, and the generated power is desirable to supply back to the mains. This kind of regenerative arrangement is called a regenerative frequency converter in this document.

A problem caused by a frequency converter, especially when comprised a regenerative mains bridge connected to a grounded network, may be the common mode voltage in the DC intermediate power bus. The fast switching speed of IGBTs cause the potential of the DC intermediate power bus to oscillate strongly, which in combination with a possible resonance in connecting cables may generate hazardous voltage spikes e.g. across the insulation between the motor winding and the grounded frame, thus shortening the lifetime of the winding insulation layers.

The problem may be avoided by using a dedicated transformer between the mains power grid and the frequency converter, but this method increases a considerably amount of the installation costs.

SUMMARY

The object of the present invention is to avoid the problems of prior art in a regenerative frequency converter by presenting a novel solution, which comprises of a combination of a filtering arrangement and a modulation method used for controlling the power electronic switches. The novel solution reduces the oscillation of the intermediate power bus and that way reduces also the stress for insulations of the load machine. The objective is achieved by what is stated in independent claims, other preferred embodiments are disclosed in the dependent claims.

One embodiment of the filtering arrangement according to the present invention comprises of a three-phase common mode inductor, connected between a LCL filter and the active front end bridge, and of capacitors in the DC intermediate circuit, connected in series such that the common point of the capacitors is connected to the star point of the LCL filtering capacitors.

A so-called 60 degree bus clamp modulation is used in the solution of one embodiment of the present invention, which means that each phase switch stays both at the high and low position for essentially ⅙ of the total cycle time.

In one embodiment of the present invention the bus clamp modulation is softened such that when moving to the bus clamp position or back from it the changes are not abrupt but they are carried out within a predefined period.

The effect of the filtering arrangement according to the present invention is that it reduces the voltage oscillations between the DC intermediate power bus and the ground. Thus also the oscillations and voltage spikes at the load machine end will be reduced which reduces the stress for insulations of machine windings.

The invention is defined in more detail in the present description and the following examples of embodiments. The scope of protection is defined in the independent claims and the preferred embodiments in other claims.

BRIEF DESCRIPTION OF THE DRAWINGS

Below the invention appears a more detailed explanation using examples with references to the enclosed figures, wherein.

DETAILED DESCRIPTION

Figure 1:
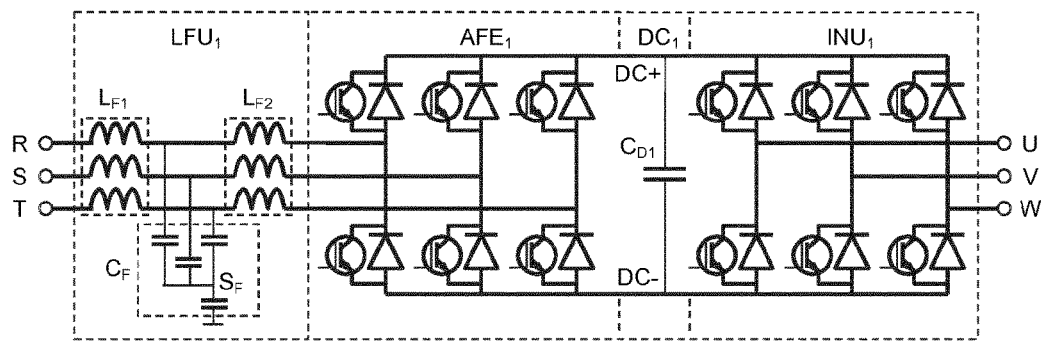
FIG. 1 presents a main circuit of a typical regenerative frequency converter.

FIG. 1 presents a simplified main circuit diagram of a known and typical regenerative frequency converter as an example of power device arrangement wherein the filtering arrangement according to the present invention may be applied.

In the example the converter comprises of an active front end bridge $AFE_1$, which is able to feed power in both directions between the 3-phase mains network R, S, T, and the intermediate DC-circuit $DC_1$. The active front end bridge $AFE_1$ is connected to the mains via a so-called LCL line filter unit $LFU_1$, comprising a first 3-phase inductor unit $LF_1$, a second 3-phase inductor unit $LF_2$, and a capacitor unit $C_F$. The inductor units $LF_1$, $LF_2$, may comprise either one 3-phase inductor (coils wounded around a common core part) or three separate 1-phase inductors. The capacitor unit $C_F$ comprises in this exemplary case three phase-specific capacitors in star-connection and a fourth capacitor between the star point $S_F$ and ground. The inverter unit $INU_1$ creates from the direct voltage circuit $DC_1$, which is filtered by a capacitor $C_{D1}$, an adjustable 3-phase output voltage U, V, W, e.g. for supplying an AC motor (not presented). $AFE_1$ and $INU_1$ bridges are similar, both consisting of 3 phase switches which are able to connect the phase terminal to either pole DC+, DC−, of the DC intermediate circuit $DC_1$. One phase switch comprises of upper leg power components (a controllable power switch, normally IGBT, with an antiparallel-connected diode) connected to DC+ and similar power components in lower leg, connected to DC−.

Figure 2:
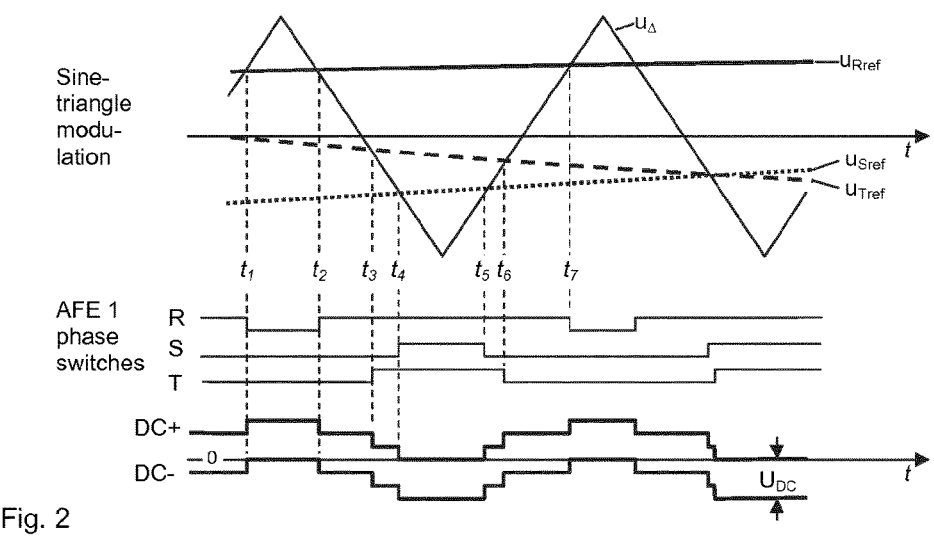
FIG. 2 illustrates modulation and voltages in an inverter bridge.

The principle on how the power switches in a frequency converter presented in FIG. 1 are controlled is called PWM (pulse width modulation). FIG. 2 illustrates a known and commonly used PWM modulation method, so-called sine-triangle wave comparison, which is used to determine how the active IGBT components of PWM-bridges, in this case of $AFE_1$, are controlled. In order to present the basic idea illustratively, analog signals are used here, though in modern control systems the same result is achieved by using digital calculation. In the method phase specific sinusoidal reference signals ($u_{Rref}$, $u_{Sref}$, $u_{Tref}$) are compared to a common triangular signal $u_\Delta$. The basic rule of the modulation is that when the instantaneous value of the sinusoidal signal is higher than that of the triangular wave, the phase switch is in upper position (i.e. the upper leg IGBT is turned on) and vice versa. E.g. at time instant $t_1$ the value of $u_\Delta$ exceeds the value of $u_{Rref}$, which causes the R-phase switch to be turned from the upper position to the lower position, etc.

The lower part of FIG. 2 illustrates the principal waveform of the DC intermediate circuit potential when the mains supply is grounded (ground potential marked as 0). Between time instants $t_1$ and $t_2$, when all phases of $AFE_1$ are in lower position, the DC− pole of the intermediate circuit $DC_1$ is at 0 potential (due to that the sum of mains phase currents and phase current gradients is always 0 when the output side of the converter is ungrounded). Similarly, between $t_4$ and $t_5$ all phases are in upper position causing DC+ pole to stay at 0 potential, and when the phase switches are in different positions the DC intermediate circuit potential is between these maximum positions as illustrated in FIG. 2.

Due to stray component values, e.g. stray capacitances between main circuit and grounded frame, and serial stray inductances in current conductors, the potential changes of DC intermediate circuit is in practice not as clean as illustrated in FIG. 2, but includes some transient oscillation with voltage overshoots after each potential step. This phenomenon may be amplified due to resonances, especially at the end of an external device connected by a long cable to the DC circuit, resulting voltage spikes which may be hazardous to insulations.

Figure 3:
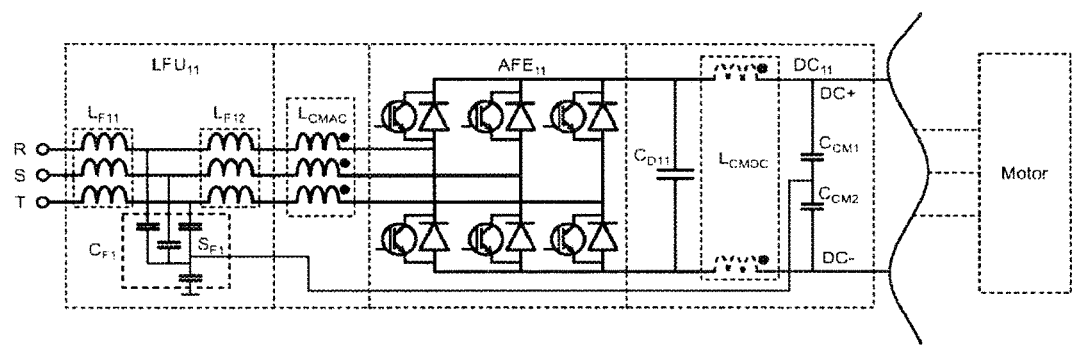
FIG. 3 presents a filtering arrangement according to one embodiment of the present invention.

FIG. 3 presents an exemplary embodiment of a filtering arrangement according to the present invention, used for reducing transient oscillation between the electric potential between the intermediate power bus $DC_{11}$ and the ground. The DC power bus $DC_{11}$ in this example belongs to a similar regenerative frequency converter as presented in FIG. 1, but for simplicity the inverter unit is not presented here. As in FIG. 1, the converter comprises of an active front end bridge $AFE_{11}$, which is able to feed power in both directions between the 3-phase mains network R, S, T, and the intermediate DC-circuit $DC_{11}$. The active front end bridge $AFE_{11}$ is connected to the mains via a so-called LCL line filter unit $LFU_{11}$, comprising a first 3-phase inductor unit $LF_{11}$ with mains side terminals and motor side terminals, a second 3-phase inductor unit $LF_{12}$ and a capacitor unit $CF_1$, comprising phase-specific capacitors between the motor side terminals of the first inductor unit and a star point $SF_1$, which star point is connected to ground via a fourth capacitor.

The filtering arrangement according to an embodiment of the present invention comprises a common mode three-phase inductor unit $L_{CMAC}$, connected between the line filter unit $LFU_{11}$ and the active front end bridge $AFE_{11}$ as presented in FIG. 3. In another embodiment the connection order of the common mode three-phase inductor unit $L_{CMAC}$ and the second 3-phase inductor unit $L_{F12}$ is the other way around with the same filtering effect. In that case the common mode three-phase inductor unit $L_{CMAC}$ is connected between the first 3-phase inductor unit $LF_{11}$ and the second 3-phase inductor unit $LF_{12}$. In one embodiment of the invention the common mode three-phase inductor unit $L_{CMAC}$ is replaced by a two-phase common mode inductor unit $L_{CMDC}$, placed in the intermediate circuit between the $AFE_{11}$ unit and the inverter unit (not shown in FIG. 3), as indicated in FIG. 3 by dotted lines. Further, the filtering arrangement comprises a filter capacitor arrangement, consisting of a series connection of capacitors $C_{CM1}$, $C_{CM2}$, which are connected between the poles of the intermediate circuit $DC_{11}$ such that the common point of the filtering capacitors $C_{CM1}$, $C_{CM2}$, is connected to the star point $S_{F1}$ of the capacitor unit $C_{F1}$ in the line filter unit $LFU_{11}$.

Figure 4A:
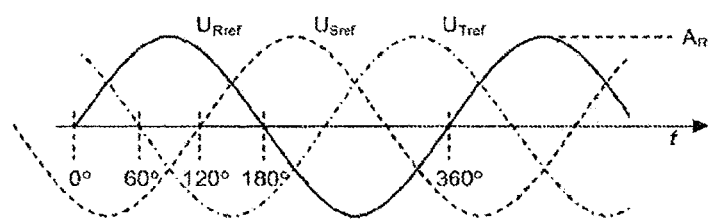
FIG. 4A illustrates reference voltages according to the normal sine-triangle comparison PWM method.
Figure 4B:
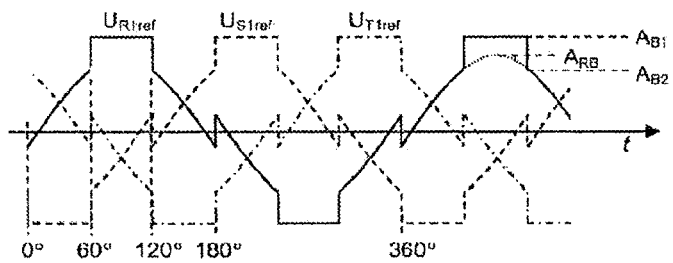
FIG. 4B illustrates reference voltages according to the normal 60 degree bus clamp modulation.
Figure 4C:
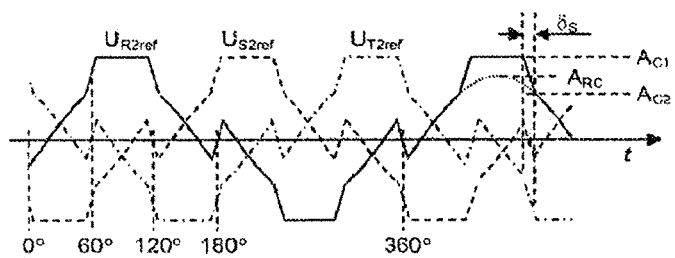
FIG. 4C illustrates reference voltages according to the softened bus clamp modulation according to one embodiment of the present invention.

FIGS. 4A-4C illustrate reference signals used in different PWM modulation methods. An analog format is used here for illustrative purpose, though in modern control systems digital calculation is normally used for determining the control signal patterns of the power switches.

FIG. 4A illustrates sinusoidal phase reference signals $U_{Rref}$, $U_{Sref}$, $U_{Tref}$ as used in normal sine-triangle wave comparison method. The amplitude $A_R$ of the sinusoidal reference signals is proportional to the desired output voltage, whereas the amplitude of the triangle wave signal (not presented) stays constant.

FIG. 4B illustrates phase reference signals $U_{R1ref}$, $U_{S1ref}$, $U_{T1ref}$ of a so-called 60° bus clamp modulation, presented e.g. in the book "Pulse Width Modulation for Power Converters" by D. G. Holmes and T. A. Lipo. In this method a parallel and equal step (i.e. the difference between levels $A_{B1}$ and $A_{B2}$ in FIG. 4B) is added to all reference signals essentially at every 60° period change point such that the virtual sinusoidal reference signal having the highest absolute value raises temporarily to a high level $A_{B1}$ which exceeds both the maximum amplitude of the virtual sinusoidal reference signal ($A_{RB}$) and the constant amplitude of the triangle wave signal (not presented) used in the comparison. As illustrated in the figure, the step-like increase is positive or negative according to the sign of the highest absolute value of the virtual sinusoidal reference signal. This increase in the reference signal level causes, according to the normal signal comparison rule, the phase switch to stay at a constant position as long as the level increase lasts. The period of constant phase switch position, called as the bus clamp period, lasts normally ⅙ of the full cycle time (=60°) around the positive and negative maximum values of the virtual sinusoidal reference signal.

FIG. 4C illustrates phase reference signals $U_{R2ref}$, $U_{S2ref}$, $U_{T2ref}$ of a softened bus clamp modulation according to one embodiment of the present invention. Here the behavior of the reference signals are otherwise similar to the 60° bus clamp modulation illustrated in FIG. 4B, but here the edges of the added signal around each 60° period change point are not abrupt but the level shift (i.e. the difference between levels $A_{C1}$ and $A_{C2}$ in FIG. 4C) is carried out within a predefined period $\delta_S$. The used level shift period $\delta_S$ in the softened bus clamp modulation according to the present invention may be in range 1 ... 30°, advantageously 7.5°.

The curve form during the level shift may be e.g. sinusoidal or quadratic instead of the linear illustrated as an example in FIG. 4C.

According to one embodiment of the present invention the 60° bus clamp modulation method or the softened bus clamp modulation method may be used either only in the AFE bridge or only in the INU bridge or in both bridges.

Figure 5A:
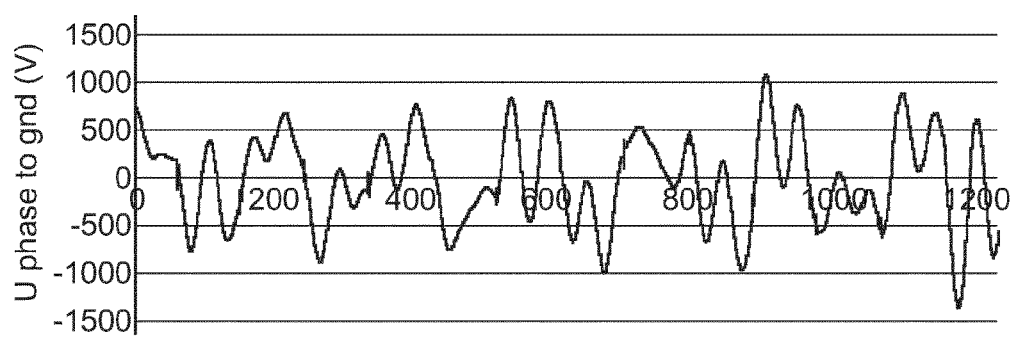
FIGS. 5A and 5B illustrate voltage waveforms between an output (motor side) connection of a regenerative frequency converter and ground, without and with a filtering arrangement according to one embodiment of the present invention.
Figure 5B:
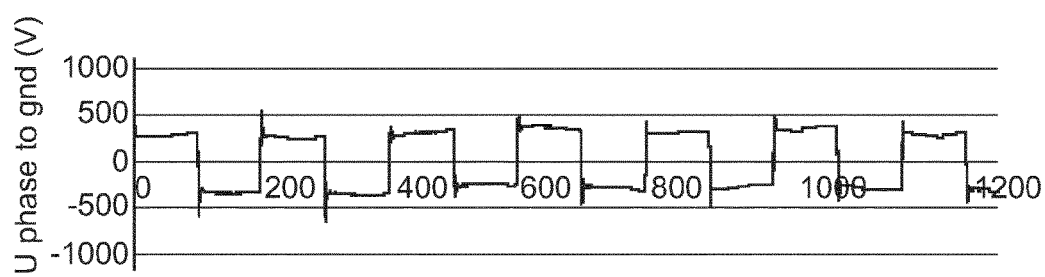

FIGS. 5A and 5B illustrate the effect of a filtering arrangement in a regenerative frequency converter according to one embodiment of the present invention, under similar conditions from the installation point of view (grounding, supply network, motor cable, motor).

FIG. 5A illustrates the voltage between an output connection and ground, without any filtering method and arrangement. It can be seen that the voltage fluctuates strongly, with peak values reaching values about ±1500 V. The oscillation is mainly caused by a resonance caused by stray inductances e.g. in motor cable and capacitances in the circuit (e.g. stray capacitances between motor winding and ground and capacitance from the line filter unit $L_{F1}$ to ground).

FIG. 5B illustrates the same voltage as presented in FIG. 5A, when the device is equipped with a filtering arrangement according to one embodiment of the present invention and the softened bus clamp modulation used in AFE bridge. Now the voltage fluctuation is very limited, peak to peak values staying in the range of about ±500 V.

While the invention has been described with reference to the previous embodiments, it should be recognized that the invention is not limited to these embodiments, but many modifications and variations will become apparent to persons skilled in the art without departing from the scope of the invention, as defined in the appended claims.

What is claimed is:

1. A filtering arrangement for a system comprising a regenerative frequency converter and a motor,
    which regenerative frequency converter has an intermediate DC circuit comprising positive and negative pole, and
    which regenerative frequency converter is connected to a supplying 3-phase mains network via a line filter unit comprising in serial connection a first 3-phase inductor unit with mains side terminals and motor side terminals and a second 3-phase inductor unit, and a 3-phase capacitor unit which comprises phase-specific capacitors which are connected in star connection between the motor side terminals of the first 3-phase inductor unit and a star point, which star point is connected to ground via a fourth capacitor,
    wherein
    the filtering arrangement further comprises a common mode inductor unit and a filtering capacitor unit,
    which filtering capacitor unit comprises two capacitors in serial connection between the poles of the intermediate DC circuit such that the common point of the capacitors is connected to the star point of the capacitor unit in the line filter unit, and
    wherein the filter arrangement is configured to determine the control pattern of the controllable power switches by using a 60° bus clamp modulation or a softened 60° bus clamp modulation.

2. The filtering arrangement according to claim 1, wherein
    the common mode inductor has three phases and is connected between the motor side terminals of the first 3-phase inductor unit and the AC terminals of the active front end bridge.

3. The filtering arrangement according to claim 2, wherein
    the common mode inductor is connected between the line filter unit and the active front end bridge.

4. The filtering arrangement according to claim 2, wherein
    the common mode inductor is connected between the first 3-phase inductor unit and the second 3-phase inductor unit.

5. The filtering arrangement according to claim 1, wherein
    the common mode inductor has two phases and is connected in the DC intermediate circuit between the active front end bridge and the inverter unit.

6. The filtering arrangement according to claim 1, wherein
    the filtering arrangement is configured to use the 60° bus clamp modulation or the softened 60° bus clamp modulation when determining the control pattern of the controllable power switches in the front end bridge.

7. The filtering arrangement according to claim 1, wherein
    the filtering arrangement is configured to use the 60° bus clamp modulation or the softened 60° bus clamp modulation when determining the control pattern of the controllable power switches in the inverter bridge.

8. The filtering arrangement according to claim 1, wherein
    the filtering arrangement is configured to use the 60° bus clamp modulation or the softened 60° bus clamp modulation when determining the control pattern of the controllable power switches both in the front end bridge and in the inverter bridge.

9. The filtering arrangement according to claim 6, wherein
    the filtering arrangement is configured to use 1 . . . 30° level shift period in the softened 60° bus clamp modulation.

10. The filtering arrangement according to claim 2, wherein
    the filtering arrangement is configured to use the 60° bus clamp modulation or the softened 60° bus clamp modulation when determining the control pattern of the controllable power switches in the front end bridge.

11. The filtering arrangement according to claim 3, wherein
    the filtering arrangement is configured to use the 60° bus clamp modulation or the softened 60° bus clamp modulation when determining the control pattern of the controllable power switches in the front end bridge.

12. The filtering arrangement according to claim 4, wherein
    the filtering arrangement is configured to use the 60° bus clamp modulation or the softened 60° bus clamp modulation when determining the control pattern of the controllable power switches in the front end bridge.

13. The filtering arrangement according to claim 5, wherein
    the filtering arrangement is configured to use the 60° bus clamp modulation or the softened 60° bus clamp modulation when determining the control pattern of the controllable power switches in the front end bridge.

14. The filtering arrangement according to claim 2, wherein
    the filtering arrangement is configured to use the 60° bus clamp modulation or the softened 60° bus clamp modulation when determining the control pattern of the controllable power switches in the inverter bridge.

15. The filtering arrangement according to claim 3, wherein
the filtering arrangement is configured to use the 60° bus clamp modulation or the softened 60° bus clamp modulation when determining the control pattern of the controllable power switches in the inverter bridge.

16. A filtering method for a system comprising a regenerative frequency converter and a motor,
which regenerative frequency converter has an intermediate DC circuit comprising positive and negative pole, and
which regenerative frequency converter is connected to a supplying 3-phase mains network via a line filter unit comprising in serial connection a first 3-phase inductor unit with mains side terminals and motor side terminals and a second 3-phase inductor unit, and a 3-phase capacitor unit which comprises phase-specific capacitors which are connected in star connection between the motor side terminals of the first 3-phase inductor unit and a star point, which star point is connected to ground via a fourth capacitor,
wherein
the system comprises a common mode inductor unit and a filtering capacitor unit,
which filtering capacitor unit comprises two capacitors in serial connection between the poles of the intermediate DC circuit such that the common point of the capacitors is connected to the star point of the capacitor unit in the line filter unit, and
wherein the control pattern of the controllable power switches is determined by using a 60° bus clamp modulation or a softened 60° bus clamp modulation.

17. The filtering method according to claim 16, wherein
the 60° bus clamp modulation or the softened 60° bus clamp modulation is used when determining the control pattern of the controllable power switches in the front end bridge.

18. The filtering method according to claim 16, wherein
the 60° bus clamp modulation or the softened 60° bus clamp modulation is used when determining the control pattern of the controllable power switches in the inverter bridge.

19. The filtering method according to claim 16, wherein
the 60° bus clamp modulation or the softened 60° bus clamp modulation is used when determining the control pattern of the controllable power switches both in the front end bridge and in the inverter bridge.

20. The filtering method according to claim 16, wherein
1 . . . 30° level shift period is used in the softened 60° bus clamp modulation.

\* \* \* \* \*